United States Patent [19]

Eldridge et al.

[11] Patent Number: 5,092,154
[45] Date of Patent: Mar. 3, 1992

[54] CALIBRATION APPARATUS AND METHOD

[75] Inventors: Lawrence B. Eldridge, Littleton; Stephen P. Smith, Denver, both of Colo.

[73] Assignee: Coors Brewing Company, Golden, Colo.

[21] Appl. No.: 512,273

[22] Filed: Apr. 19, 1990

[51] Int. Cl.$^5$ .............................. G01L 25/00
[52] U.S. Cl. .................................... 83/1 B
[58] Field of Search ................... 73/1 B, 835, 1 C

[56] References Cited

U.S. PATENT DOCUMENTS

| | | | |
|---|---|---|---|
| 2,672,755 | 3/1954 | Hohner | 73/1 B X |
| 3,464,261 | 9/1969 | Helm | 73/835 |
| 4,548,083 | 10/1985 | Schuerer et al. | 73/827 |
| 4,850,230 | 7/1989 | Elridge | 73/835 |
| 4,938,070 | 7/1990 | Pessina et al. | 73/835 |

FOREIGN PATENT DOCUMENTS

| | | | |
|---|---|---|---|
| 1171638 | 6/1964 | Fed. Rep. of Germany | 73/1 B |
| 3010054 | 11/1980 | Fed. Rep. of Germany | 73/835 |
| 546788 | 3/1977 | U.S.S.R. | 73/1 B |
| 645043 | 1/1979 | U.S.S.R. | 73/1 B |
| 1262303 | 10/1986 | U.S.S.R. | 73/1 B |
| 2179162 | 2/1987 | United Kingdom | 73/1 B |

OTHER PUBLICATIONS

Morehouse Machine Company Bulletin 169 "Morehouse Transistorized Calibrating and Weighing System", 4 pages; published by Mar. 1959.
"Calibration Balancing and Reading Interpolation for Strain-Gauge Dynamometers", *Materials Testing;* vol. 18, No. 1, pp. 19–21, Jan. 1976, A. Peiter et al.

*Primary Examiner*—Tom Noland
*Attorney, Agent, or Firm*—Klass & Law

[57] ABSTRACT

Apparatus and method are disclosed for calibrating a load cell such as a load cell used in apparatus for measuring the forces applied to a pull tab during the formation of an opening in a container lid. The load cell first transmits a signal to a computer-recorder which is indicative of a no force applied condition. A known maximum force is then applied to the load cell which transmits a signal to the computer-recorder which is indicative of a known maximum force applied condition. An intermediate known force is then applied to the load cell which transmits a signal to the computer-recorder which is indicative of a known intermediate force applied condition. The computer-recorder uses the three signals to establish a load slope for use in the force measuring apparatus.

18 Claims, 2 Drawing Sheets

CALIBRATION APPARATUS AND METHOD

FIELD OF THE INVENTION

This invention relates generally to the calibration of measuring apparatus and more specifically to the calibration of a load cell.

BACKGROUND OF THE INVENTION

In U.S. Pat. No. 4,850,230 issued to L. B. Eldridge, there is illustrated a measuring system for determining the pull force placed on a pull tab during the formation of the opening in a can, which patent is incorporated herein by reference thereto. The Eldridge patent uses a load cell which generates signals representing the forces applied thereto during the opening operation and sends such signals to a computer and recording apparatus. In order to verify the accuracy of the measurements, it is necessary to calibrate the load cell at periodic intervals.

One method for calibrating the load cell involves the use of a mechanical, spring-type, dial pressure gage to place known forces on the load cell. The load cell transmits a signal, such as a voltage, for each known force to a computer-recorder, which establishes a load slope between a no force condition and a maximum force applied condition. Known forces between a no force condition and a maximum force condition may also be used to establish a load slope. After being programmed, the computer-recorder will respond to all signals received from the load cell and record any force applied thereto between the no force applied condition and the maximum force applied condition. While this system does calibrate the load cell, it takes considerable time to perform. Therefore, it was desirable to develop calibration apparatus which would be an automatic function of the measuring apparatus described in the Eldridge patent.

BRIEF DESCRIPTION OF THE INVENTION

This invention provides apparatus and method for calibrating a load cell used to determine the forces placed on a pull tab during the formation of an opening in the can wherein a plurality of control means are automatically operated to perform the calibration in a minimum period of downtime.

In a preferred embodiment of the invention, which is added to the apparatus in the Eldridge patent, the load cell is mounted on the apparatus used to perform the opening of the pull tab and is connected to an arm on which the forces, applied during the formation of the opening, are applied. A bracket is mounted on the arm and extends outwardly therefrom. A pivot assembly is mounted at a fixed location and has a pendulum arm pivotally mounted on the pivot assembly for pivotal movement. A stop member is mounted on an end portion of the pendulum arm and is adapted to be moved into contact with the bracket. Force applying means are pivotally mounted on the pivot assembly and are operatively connected to the pendulum arm to move the stop member against the bracket to apply a force thereto. The force applying means comprises a lever arm having one end connected to the pivot assembly and a support member mounted on the other end of the lever arm. An adjustable counterweight unit is mounted on the pivot assembly for counterbalancing the lever arm and the support member so that there is no rotation thereof when no load is on the support member and the portion of the stop member lies in a vertical plane passing through the axis of rotation of the pivot assembly. The pivot assembly comprises a housing mounted at a fixed location having a passageway extending therethrough and having at least one bearing mounted therein. A pivot shaft is mounted for rotation in the bearing and has opposite end portions projecting out of the passageway. A first collar is mounted on the pivot shaft for rotation therewith and has oppositely facing openings with one end of the lever arm mounted in one of the openings and a portion of the counterweight mounted in the other of the openings. A second collar is secured to the pivot shaft for rotation therewith and has an opening in which the pendulum arm is secured. A movable stop plate is provided and functions when in an up position to prevent movement of the lever arm to keep the stop member out of contact with the bracket.

In operation of the apparatus of this invention, the normal measuring operation in the Eldridge patent is interrupted so that the apparatus of this application can be used to calibrate the load cell. The stop plate is moved to an up position to prevent the stop member from contacting the bracket so that no force is being applied to the bracket. The load cell signal generated by the load cell under the no force applied condition is transmitted to a computer recorder. The stop plate is then moved to a down position permitting the stop member to contact the bracket. A known maximum force, greater than any force which will be placed on the load cell during its normal operation, is placed on the lever arm which applies this maximum force to the bracket through the pivot assembly and the stop member. As in the Eldridge patent, there is no movement of the bracket. The load cell signal generated by the known maximum weight is transmitted to the computer-recorder. A known intermediate force, between no force and the known maximum force, is placed on the lever arm which applies the known intermediate force to the bracket through the pivot assembly and the stop member. The load cell signal generated by the known intermediate force is transmitted to the computer-recorder which uses the three readings to establish a load slope so that it can respond to all signals received from the load cell during its normal operation.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
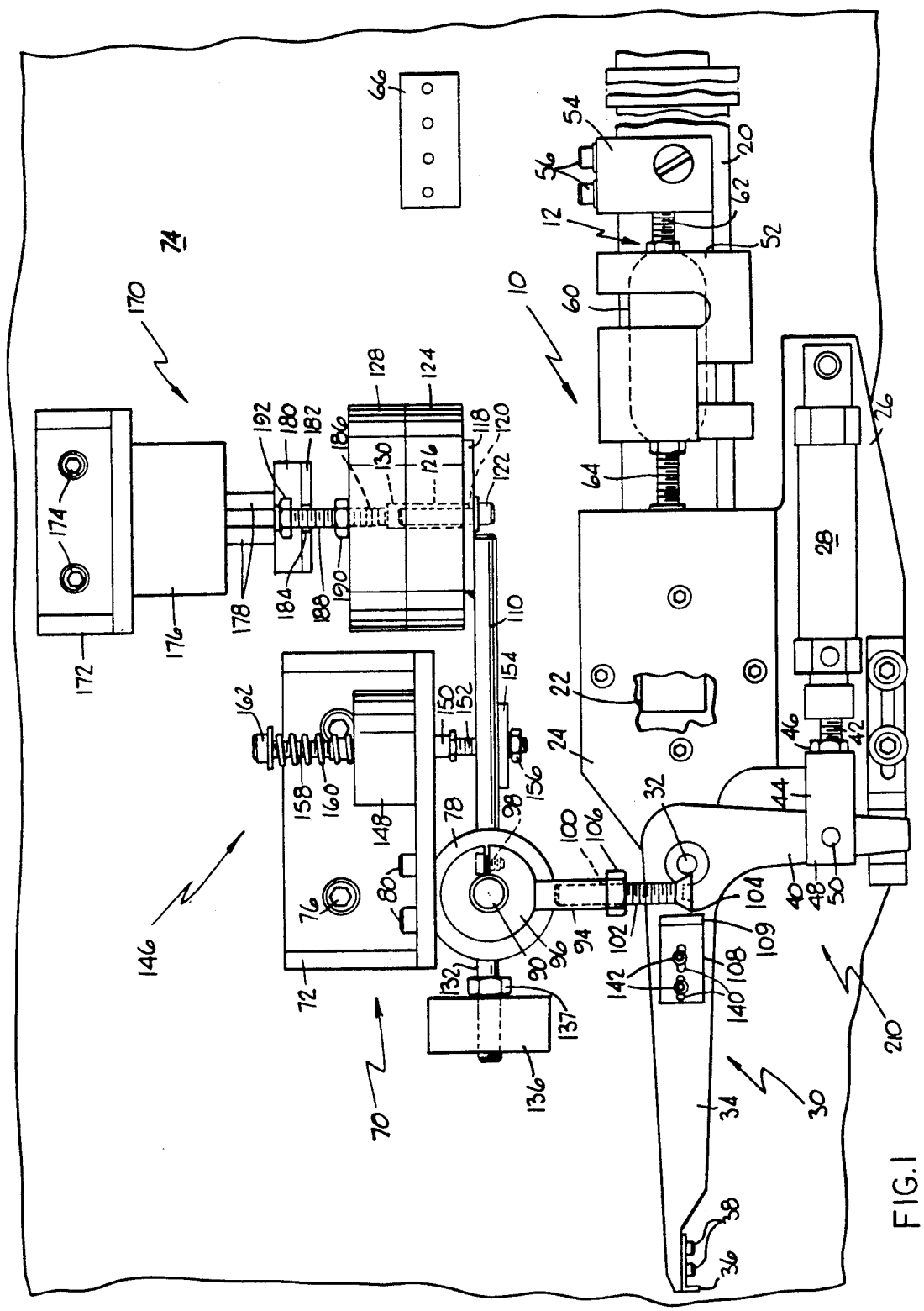
FIG. 1 is a side elevational view of the calibration apparatus of this invention being used in the apparatus of the Eldridge patent.

In the lower portion of FIG. 1, there is illustrated the force measuring means illustrated in FIGS. 11 and 12 of the Eldridge patent. The force measuring means 10 comprise a conventional computer operated slide assembly 12 such as a Lintra Rodless Cylinder C/45025-EL-EL-4.0. A mounting bracket 20 is secured to the slide assembly 12 for movement therewith. A conventional ball slide assembly 22, such as a Daedal Ball Slide 4501, has one portion thereof mounted on the mounting bracket 20 and the other portion thereof mounted on a support plate 24 so that the support plate 24 is theoretically free to move relative to the mounting bracket 20 in response to forces applied thereto. The support plate 24 has an extension support member 26 on which is mounted an air cylinder 28. An angularly shaped arm 30 is pivotally mounted on the support plate 24 by pivot means 32 such as a pivot pin or a bearing. The angularly shaped arm 30 has a first arm portion 34 on which is mounted the hook member 36 by headed threaded bolts 38 received in threaded openings (not shown) in the first arm portion 34. The angularly shaped arm 30 has a second arm portion 40. The air cylinder 28 has a threaded actuating rod 42 which is moved by the air cylinder 28 in linear directions. A connecting member 44 is adjustably mounted on the threaded actuating rod 42 by the nut 46 for movement with the actuating rod 42. The connecting member 44 has a bifurcated portion 48 in which is mounted a pivot pin 50. The angularly shaped arm 30 is rotatably mounted on the pivot pin 50.

The mounting bracket 20 has an outwardly projecting extension member 52 to which is fixedly secured to a plunger bracket 54 by headed threaded bolts 56. A load cell 60, such as an Interface Load Cell SM-10, has a threaded first connecting rod 62 extending outwardly therefrom and is rotatably mounted on the plunger bracket 54. The load cell 60 has a threaded second connecting rod 64 extending outwardly therefrom and is rotatably mounted on the support plate 24. The load cell 60 measures the force applied to the hook member 36 and transmits a signal, such as a voltage signal, to a computer-recorder 66 which is part of the standard computer system operating the apparatus of the Eldridge patent.

The calibration apparatus 70 comprises a first support bracket 72 mounted on a support wall 74 by headed threaded bolts 76. A housing 78 is mounted on the support bracket 72 by headed threaded bolts 80 and has a central passageway 82 extending therethrough. An annular recess 84 is formed at each end of the passageway 82 and a bearing 86 mounted in each annular recess 84. A pivot shaft 88 having a central longitudinal axis is mounted in the bearings 86 for rotational movement relative to the housing 78 and has end portions 90 and 92 projecting axially outwardly from each bearing 86.

A pendulum arm 94 has an integral split collar 96 at one end thereof that is securely fastened to the end portion 90 of the pivot shaft 88 by a headed threaded bolt 98 so that the pendulum arm 94 rotates with the pivot shaft 88. The pendulum arm 94, when mounted on the pivot shaft 88, has a central longitudinal axis that, when extended, passes through the central longitudinal axis of the pivot shaft 88. A threaded opening 100 extends through the other end portion of the pendulum arm 94 and has a central longitudinal axis that coincides with the central longitudinal axis of the pendulum arm 94. A headed threaded screw 102, such as an allen head, is threaded into the threaded opening 100 and has a circular contact edge portion 104 which is adjustable by screwing the headed threaded screw 102 into or out of the threaded opening 100. The headed threaded screw 102 has a central longitudinal axis which coincides with the central longitudinal axis of the threaded opening 100. A jam nut 106 is threaded onto the headed threaded screw 102 and bears against the end of the pendulum arm to hold the headed threaded screw 102 in an adjusted position. The contact edge portion 104 is machined to have a sharpness equal to a knife edge and has a hardness of $R_c45$. An L-shaped bracket having a base portion 108 and an abutment flange portion 109 which projects outwardly from the base portion 108 at an angle of about 90 degrees is adjustably secured to the first arm portion 34 and the abutment flange portion 109 extends outwardly therefrom so that it can be contacted by the contact edge portion 104 which applies a force thereto.

Figure 2:
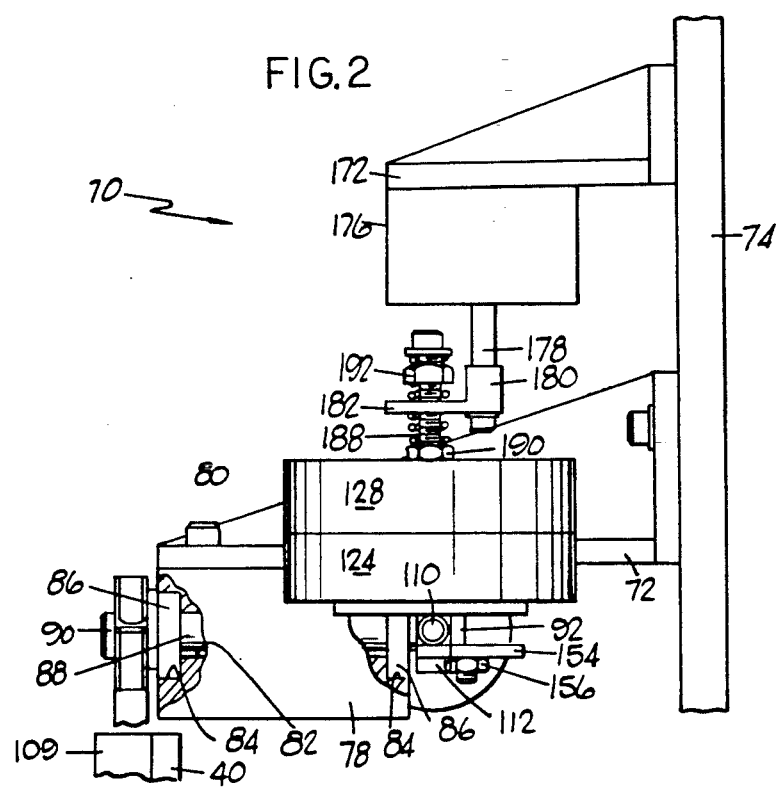
FIG. 2 is an end elevational view from the right side of FIG. 1 with parts removed and illustrating the calibration apparatus.
Figure 3:
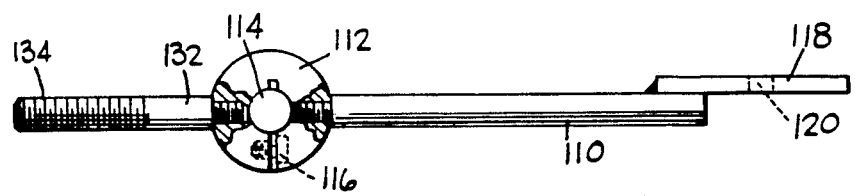
FIG. 3 is a side elevational view with parts in section of a portion of the apparatus.

An elongated rod 110, FIGS. 1-3, has one end portion thereof secured to a split collar 112 by suitable means, such as by a threaded connection or by welding, and has a central opening 114 so that it can be mounted on the end portion 92 of the pivot shaft 88. The elongated rod 110 has a central longitudinal axis that, if extended, intercepts the central longitudinal axis of the pivot shaft 88 when the elongated rod 110 is mounted thereon. A headed threaded bolt 116 secures the split collar 112 to the pivot shaft 88 so that the split collar 112 will rotate the pivot shaft 88 when a force is applied thereto. A support plate 118 is secured to the other end portion of the elongated rod 110 and has a threaded central opening 120. A threaded pin 122 is threaded in the central opening 120 and extends upwardly therefrom. A first known weight 124 has a central opening 126 so that the known weight 124 may be moved over the pin 122 and be supported on the support plate 118 to apply a force thereto. A second known weight 128 has a central recess 130 so that it can be moved over the end of the pin 122 and moved into contact with the first known weight 124 so as to apply an additional force on the support plate 118. In the preferred embodiment, the first and second known weights are the same weight, i.e. 1.495 pounds, but they can be of differing weights. The weights are mounted, as described below, so that they can apply the maximum force that is to be applied on the load cell 60 during its intended use.

A rod 132 is secured to the split collar 112 by suitable means, such as by a threaded connection or by welding, and extends in a direction opposite to that of the elongated rod 110. The rod 132 has a central longitudinal axis that is aligned with the central longitudinal axis of the elongated rod 110. The rod 132 has a threaded end portion 134 on which an adjustable counterweight 136 is threadedly mounted. The counterweight 136 is moved to balance the elongated rod 110 and the support plate 118, with no weight thereon and is then locked in position by the jamb nut 137. In the balanced position, the longitudinal axis of the headed threaded screw 102 lies in a vertical plane passing through the axis of rotation of the pivotal shaft 88. The base portion 108 has a pair of slots 140 through which a pair of headed threaded bolts 142 pass and are threaded into threaded openings in the first arm portion 34. The threaded bolts 142 are loosened so that the abutment flange portion 109 can be moved until it is spaced from the contact edge portion 104 a distance of between about 0.030 and 0.100 inch and then the bolts 142 are tightened to hold the abutment flange portion 109 at a fixed location on the first arm portion 34. If the abutment flange portion 109 should be too close to the stem portion of the threaded screw 102 to prevent normal operation of the apparatus in the Eldridge patent, a portion of the abutment flange portion 109 not to be contacted by the contact edge portion 104 can be removed.

A first control means 146, FIG. 1, comprises an air cylinder 148 fixedly mounted on the first support bracket 72 and having a movable piston rod 150. A threaded rod 152 is secured to one end of the piston rod 150 for movement therewith and is threaded through a threaded opening in a stop plate 154. A lock nut 156 is used to lock the stop plate 154 at a desired location on the threaded rod 152 for adjustment purposes. A headed screw 158 is secured in the other end of the piston rod 150 for movement therewith. A spring 160 is located between the head portion 162 and the air cylinder 140 and urges the piston rod 150 to an up position so that the stop plate 154 is in contact with the elongated rod 110 to prevent the downward movement of the elongated rod. The stop plate 154 is adjusted when in the up position. The stop nut 156 is loosened and the stop plate 154 is rotated to move over the threaded rod 152 until it just contacts the elongated rod 110. The stop nut 156 is then tightened. This adjustment should agree with the counter weight 136 adjustment to keep the contact edge 104 spaced from the abutment flange portion 109. The air cylinder 148 operates to move the piston rod 150 and therefore the stop plate 154 to a down position for purposes described below.

A second control means 170, FIGS. 1 and 2, comprises a second support bracket 172 fixedly secured to the support wall 74 by threaded bolts 174. An air cylinder 176 is fixedly mounted on the second support bracket 172 and has a pair of movable piston rods 178 which are secured to a block member 180 so that the block member 180 moves with the piston rods 178. A ledge 182 projects outwardly from the block member 180 and has a slot 184 formed therein. The second known weight 128 has a threaded opening 186 in which is mounted a threaded bolt 188. A jam nut 190 holds the second known weight 128 in position on the threaded bolt 188 for movement therewith. The threaded bolt 188 passes through the slot 184 and has an enlarged integral head portion 192 adapted to be contacted by the portions of the ledge 182 around the slot 184. The piston rods 178 of the air cylinder 176 function to move between a down position illustrated in FIG. 1 wherein there is no contact between the head portion 192 and the ledge 182 and an up position wherein ledge 182 is moved by the piston rods 178 to contact the head portion 192 and lift the second known weight 128 off of the first known weight 124. The weight of the threaded rod 188, the head portion 192 and the lock nut 190 is included as part of the second known weight 128.

The apparatus is designed so that the first and second known weights 124 and 128 exert a load force on the abutment flange portion 109 in a 2 to 1 ratio. This is accomplished by mounting the elongated rod 110 so that the center of the load supported thereon is located 5.00 inches from the central longitudinal axis of the pivot shaft 88. The headed threaded screw 102 is adjusted so that the contact edge portion 104 is located 2.50 inches from the central longitudinal axis of the pivot shaft 88 when it contacts the abutment flange portion 109. In the operation of the Eldridge apparatus, the maximum force placed on the load cell is less than six pounds. Therefore, the first and second known weights 124 and 128 each weigh 1.495 pounds so that the force placed on the bracket 108 by these weights is 5.98 pounds.

Figure 4:
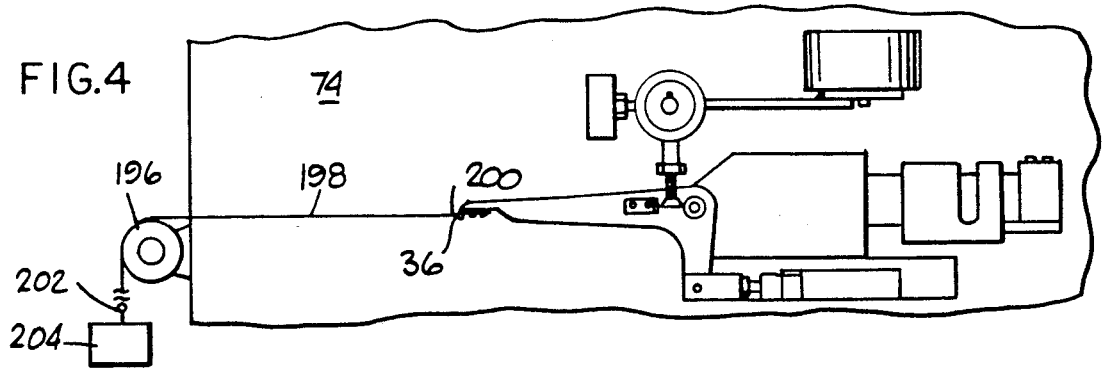
FIG. 4 a schematic illustration of adjusting apparatus.

In FIG. 4, there is illustrated apparatus for use in positioning the contact edge portion 104 so that the known force being applied to the abutment flange portion 109 by the first and second known weights 124 and 128 is accurate. As stated above, when the stop plate 154 is in the up position, the contact edge portion 104 is spaced from the abutment flange portion 109 a distance of between about 0.030 and 0.100 inch so as to minimize the distance that it has to be moved to contact the adjustment flange portion 109. The stop plate 154 is moved to the down position so that the first and second known weights 124 and 128 function to move the contact edge portion 104 into contact with the abutment flange portion 109 and apply a force thereto. The load cell is actuated and transmits a signal to the computer-recorder 66 which records the signal. The stop plate 154 is then moved to the up position.

A precision pulley 196 is mounted on the support wall 74. A cord 198 passes over the precision pulley 196 and has a first loop 200 at one end thereof for engagement with the hook 36 and a second loop 202 at the other end thereof. A known weight 204, which is equal to the first and second known weights 124 and 128 is supported from the second loop 202 to place a force on the load cell 60 so that it transmits a signal to the computer recorder 66. The recorded signal from the known weight 204 is compared to the recorded signal from the first and second known weights 124 and 128. If there is a difference in the recorded signals, the jam nut 106 is loosened and the contact edge portion 104 is adjusted by rotating the threaded headed screw 102. The above procedure is repeated to ensure that the correct adjustment has been made.

The apparatus of this application is then used to calibrate the load cell 60. The air cylinder 148 is in the up position so that the stop plate 154 prevents downward movement of the rod 110 so that the contact edge portion 104 is spaced from the flange portion 109. As the first phase of the calibration, with the contact edge portion 104 out of contact with the abutment flange portion 109, the load cell 60 transmits a signal to the computer-recorder 66 which is indicative of a no force applied condition.

In the second phase of the calibration, the air cylinder 176 is in the down position, its normal position, so that the first and second known weights 124 and 128 are being supported by the support plate 118. The air cylinder 148 is actuated to move the stop plate 154 to the down position. As the stop plate 154 moves downwardly, the elongated rod 110 also moves downwardly and rotates the pivot shaft 88 to move the pendulum arm 94 so that the contact edge portion 104 moves into contact with the abutment flange portion 109. The downward movement of the stop plate 154 is continued until it is spaced a distance from the elongated rod 110 so that the force of the first and second known weights 124 and 128 is being applied to the abutment flange portion 109 which is a maximum force applied condition. In one embodiment of the Eldridge apparatus, this known maximum force is approximately six pounds. The load cell 60 transmits a signal to the computer recorder 66, representative of the maximum load condition. The computer recorder 66 now has sufficient information to establish a load slope for use in the Eldridge apparatus. However, if desired, the load slope may be further refined by using a third phase for the calibration.

In the third phase of the calibration, the air cylinder 176 is actuated to move the ledge 182 to the up position. As the ledge 182 moves upwardly, it contacts the head portion 192 and the continued upward movement thereof lifts the second known weight 128 off of the first known weight 124 so that only the force of the first known weight 124 is being applied against the abutment flange portion 109 which is an intermediate force applied condition. In the one embodiment of the Eldridge apparatus, this known intermediate force is approximately three pounds. The load cell 60 transmits a signal to the computer-recorder 66 which is indicative of the known intermediate load condition. The computer-recorder 66 now has sufficient information to establish a refined load slope for use with the apparatus in the Eldridge patent. A signal is transmitted to the air cylinder 148 to move it to the up position, to the air cylinder 176 to move it to the down position, and to the Eldridge apparatus to resume normal operations. The abutment flange portion 109 is spaced from the stem of the headed threaded screw 102 a distance to permit the normal operation of the apparatus in the Eldridge patent.

While the calibration apparatus and method have been explained relative to the Eldridge apparatus, it is understood that the apparatus and method of this application may be used to calibrate any load cell.

What is claimed is:

1. Apparatus for calibrating a load cell used to determine and record the amount of force placed thereon comprising:
   a load cell having apparatus for determining the amount of force placed thereon and sending a signal to a recording apparatus;
   mounting means for mounting said load cell at a desired location;
   first control means for applying no force on said load cell so that said load cell will generate and send a signal representing a no load condition to said recording apparatus; and
   second control means for applying a known maximum force on said load cell to be placed during its intended use so that said load cell will generate and send a signal representing a maximum load condition to said recording apparatus to establish a load slope.

2. Apparatus as in claim 1 and further comprising:
   third control means for applying a known intermediate force between said no force and said maximum force on said load cell so that said load cell will generate and send a signal representing an intermediate load condition to said recording apparatus to check said load slope.

3. Apparatus as in claim 2 and further comprising:
   apparatus for automatically operating said first, second and third control means.

4. Apparatus as in claim 1 and further comprising:
   an arm connected to said load cell;
   a bracket mounted on said arm and extending outwardly therefrom;
   a pivot assembly mounted at a fixed location;
   a pendulum arm mounted on said pivot assembly for movement therewith and having an end portion;
   a stop member mounted on said end portion and adapted to contact said bracket; and
   force applying means pivotally mounted on said pivot assembly to rotate said pivot assembly to move said pendulum arm to move said stop member against said bracket and apply a force thereto.

5. Apparatus as in claim 4 wherein said force applying means comprises:
   a lever arm having one end thereof connected to said pivot assembly for movement therewith; and
   a support member mounted on an opposite end of said lever arm for supporting a load.

6. Apparatus as in claim 5 wherein said pivot assembly comprises:
   a housing mounted at a fixed location and having a passageway, having opposite open end openings, extending therethrough;
   at least one bearing mounted in said passageway;
   a pivot shaft mounted in said bearing for rotational movement relative to said housing; and
   said pivot shaft having opposite end portions projecting outwardly from said opposite open ends.

7. Apparatus as in claim 6 and further comprising:
   a first collar mounted on one end portion of said pivot shaft for rotation therewith;
   said collar having a pair of opposite radially extending openings formed therein;
   said one end of said lever arm being mounted in one of said openings; and
   a portion of said counterweight being mounted in the other of said openings.

8. Apparatus as in claim 7 and further comprising:
   a second collar mounted on the other end portion of said pivot shaft for rotation therewith; and
   said pendulum arm being mounted to said second collar.

9. Apparatus as in claim 5 wherein said first control means comprises:
   a stop plate movably mounted between an up position and a down position;
   moving means for moving said stop plate to said up or said down position;
   said stop plate in said up position being in contact with said lever arm to prevent downward movement of said lever arm so that said stop member cannot be moved into contact with said bracket; and
   said stop plate in said down position being spaced from said lever arm to permit downward movement thereof so that said stop member can be moved into contact with said bracket.

10. Apparatus as in claim 9 wherein said second control means comprises:
    a known weight on said support member;
    said moving means moving said stop plate to said down position so that said known weight rotates said pivot assembly to move said stop member into contact with said bracket to apply said known weight on said load cell.

11. Apparatus as in claim 10 wherein said known weight comprises:
    two weight blocks, each having substantially the same weight.

12. Apparatus as in claim 11 and further comprising:
    apparatus for removing one of said weight blocks off of said support member so that a known intermediate weight is supported on said support member to rotate said pivot assembly to move said stop member into contact with said bracket to apply said known intermediate weight to said load cell.

13. Apparatus for calibrating a load cell used in measuring the forces applied to a pull tab during the formation of an opening in a container lid comprising:
    support means mounted at a fixed location;
    a support plate mounted on said support means so that it is free to move in response to a force applied thereto;
    an angularly shaped arm having a hook portion adapted to contact said pull tab;

mounting means for mounting said angularly shaped arm on said support plate;

force applying means for applying a force on said angularly shaped arm tending to move said support plate;

a load cell mounted on said support means and connected to said support plate to prevent movement thereof and to generate signals indicating the forces being applied to said angularly shaped arm and to send said signals to a recording device;

first control means for applying no force on said load cell so that said load cell will generate and send a signal representing a no load condition to said recording apparatus; and second control means for applying a known maximum force on said load cell to be placed during its intended use so that said load cell will generate and send a signal representing said maximum load condition to said recording apparatus to establish a load slope.

14. Apparatus as in claim 13 and further comprising:

third control means for applying a known intermediate force between said no force and said maximum force on said load cell so that said load cell will generate and send a signal representing an intermediate load condition to said recording apparatus to check said load slope.

15. Apparatus as in claim 13 and further comprising:

a bracket mounted on said angularly shaped arm extending a bracket outwardly therefrom;

a pivot assembly mounted at a fixed location;

a pendulum arm mounted on said pivot assembly for movement therewith and having an end portion;

a stop member mounted on said end portion and adapted to contact said bracket; and force applying means mounted on said pivot assembly to rotate said pivot assembly to move said pendulum arm to move said stop member against said bracket and apply a force thereto.

16. Apparatus as in claim 15 wherein said force applying means comprises:

a lever arm having one end thereof connected to said pivot assembly for movement therewith;

a support member mounted on an opposite end of said lever arm for supporting a load; and an adjustable counterweight unit mounted on said pivot assembly for counter balancing said lever arm and said support member so that there is no rotation thereof when no load is on said support member.

17. Apparatus as in claim 16 wherein said first control means comprises:

a stop plate movably mounted between an up position and a down position;

moving means for moving said stop plate to said up or said down position;

said stop plate in said up position being in contact with said lever arm to prevent downward movement of said lever arm so that said stop member cannot be moved into contact with said bracket; and said stop plate in said down position being spaced from said lever arm to permit downward movement thereof so that said stop member can be moved into contact with said bracket.

18. Apparatus as in claim 19 wherein said second control means comprises:

a known weight on said support member;

said moving means moving said stop plate to said down position so that said known weight rotates said pivot assembly to move said stop member into contact with said bracket to apply said known weight on said load cell.

* * * * *